(12) United States Patent
Lu et al.

(10) Patent No.: US 10,227,819 B2
(45) Date of Patent: Mar. 12, 2019

(54) COATED ARTICLE WITH LOW-E COATING HAVING DOPED SILVER IR REFLECTING LAYER(S)

(71) Applicant: Guardian Glass, LLC, Auburn Hills, MI (US)

(72) Inventors: Yiwei Lu, Ann Arbor, MI (US); Brent Boyce, Novi, MI (US); Guizhen Zhang, San Jose, CA (US); Guowen Ding, San Jose, CA (US); Daniel Schweigert, San Jose, CA (US); Scott Jewhurst, San Jose, CA (US); Daniel Lee, San Jose, CA (US); Cesar Clavero, San Jose, CA (US); Minh Le, San Jose, CA (US)

(73) Assignee: Guardian Glass, LLC, Auburn Hills, MI (US)

( * ) Notice: Subject to any disclaimer, the term of this patent is extended or adjusted under 35 U.S.C. 154(b) by 0 days.

(21) Appl. No.: 15/441,507

(22) Filed: Feb. 24, 2017

(65) Prior Publication Data

US 2018/0244569 A1    Aug. 30, 2018

(51) Int. Cl.
| | |
|---|---|
| *B32B 15/04* | (2006.01) |
| *B32B 17/06* | (2006.01) |
| *E06B 9/24* | (2006.01) |
| *C03C 17/36* | (2006.01) |
| *E06B 3/67* | (2006.01) |

(52) U.S. Cl.
CPC ............... *E06B 9/24* (2013.01); *C03C 17/36* (2013.01); *C03C 17/366* (2013.01); *C03C 17/3626* (2013.01); *C03C 17/3647* (2013.01); *C03C 17/3681* (2013.01); *E06B 3/6715* (2013.01); *E06B 2009/2417* (2013.01)

(58) Field of Classification Search
USPC ................ 428/426, 428, 432, 433, 434, 688
See application file for complete search history.

(56) References Cited

U.S. PATENT DOCUMENTS

| | | | |
|---|---|---|---|
| 4,883,721 | A | 11/1989 | Nalepka et al. |
| 5,344,718 | A | 9/1994 | Hartig et al. |
| 6,576,349 | B2 | 6/2003 | Lingle et al. |
| 6,602,608 | B2 | 8/2003 | Stachowiak |
| 6,610,410 | B2 | 8/2003 | Ebisawa et al. |

(Continued)

FOREIGN PATENT DOCUMENTS

| | | |
|---|---|---|
| CN | 101 830 644 | 9/2010 |
| KR | 2014-0012998 | 2/2014 |

(Continued)

*Primary Examiner* — Lauren R Colgan
(74) *Attorney, Agent, or Firm* — Nixon & Vanderhye P.C.

(57) ABSTRACT

Example embodiments of this invention relate to a coated article having a low-E coating including at least one infrared (IR) reflecting layer of silver that is doped with a material such as SiAl, SiZn, or SiZnCu. The IR reflecting layer(s) is part of a low-E coating, and may be sandwiched between at least transparent dielectric layers. A silver based IR reflecting layer doped in such a manner for example provides for improved corrosion resistance and chemical durability of the layer and the overall coating, and improved stability such as reduced haze upon optional heat treatment (HT), while maintaining good optical properties, compared to an Ag IR reflecting layer that is not doped.

12 Claims, 1 Drawing Sheet

(56) References Cited

U.S. PATENT DOCUMENTS

| | | |
|---|---|---|
| 7,241,506 B2 | 7/2007 | Hartig |
| 8,945,714 B2 | 2/2015 | Lao et al. |
| 9,028,956 B2 | 5/2015 | Knoll et al. |
| 9,028,983 B2 | 5/2015 | Imran et al. |
| 9,371,684 B2 | 6/2016 | Butz et al. |
| 9,556,070 B2 | 1/2017 | Wuillaume et al. |
| 2002/0037414 A1 | 3/2002 | Cunningham |
| 2005/0008852 A1 | 1/2005 | Hartig |
| 2007/0042200 A1 | 2/2007 | Wityak |
| 2010/0136365 A1 | 6/2010 | Unquera et al. |
| 2012/0219821 A1* | 8/2012 | Frank ............... C03C 17/36 428/630 |
| 2012/0225224 A1 | 9/2012 | Blacker et al. |
| 2013/0216860 A1* | 8/2013 | Imran ............ C03C 17/3618 428/623 |
| 2013/0216861 A1* | 8/2013 | Imran ............... C23C 14/35 428/630 |
| 2016/0297708 A1 | 10/2016 | Brossard |

FOREIGN PATENT DOCUMENTS

| | | |
|---|---|---|
| WO | WO 2013/126226 | 8/2013 |
| WO | WO 2016/135420 | 9/2016 |

\* cited by examiner

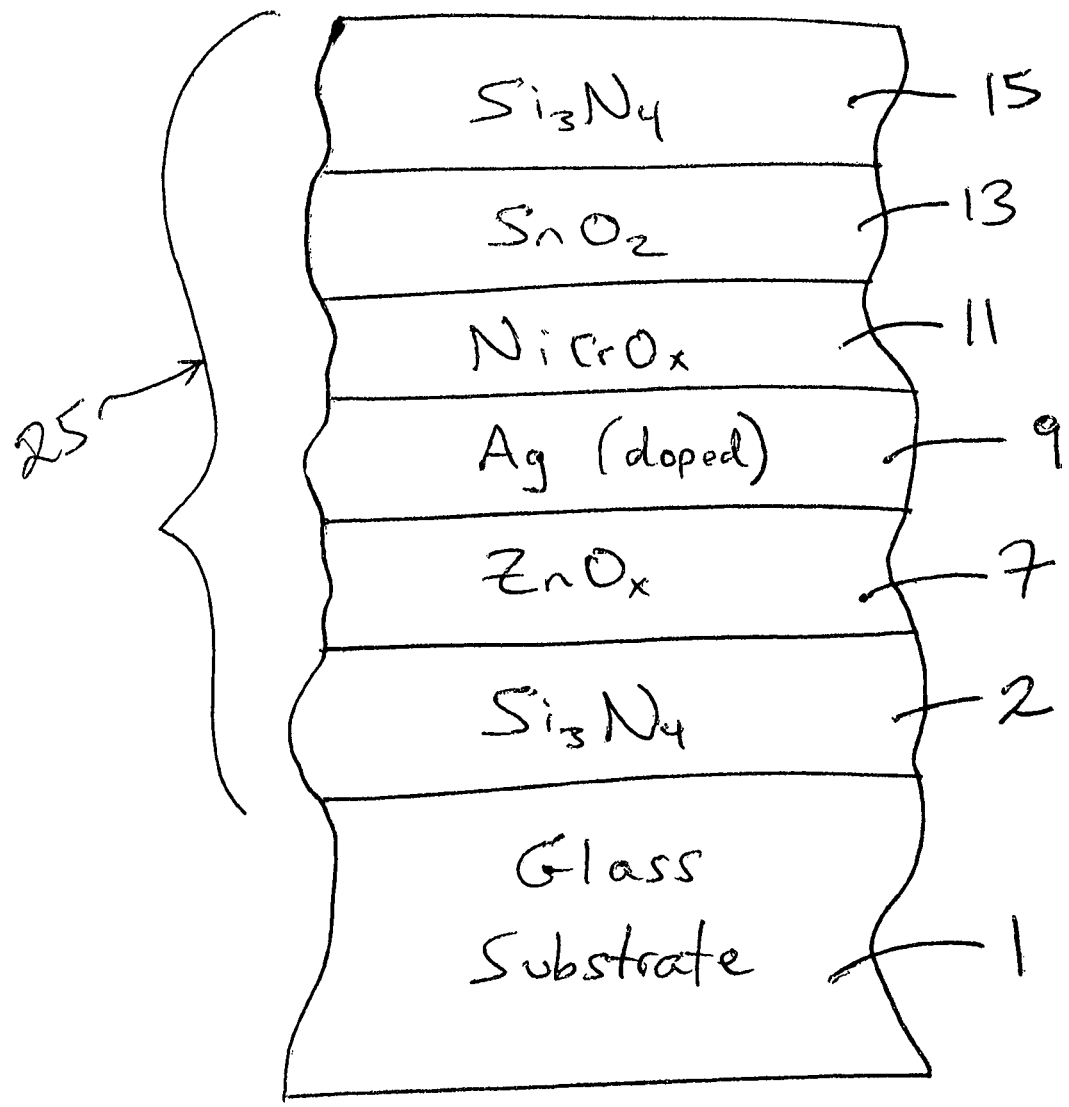

COATED ARTICLE WITH LOW-E COATING HAVING DOPED SILVER IR REFLECTING LAYER(S)

This application relates to a coated article including an infrared (IR) reflecting layer of silver that is doped in order to improve characteristics of a low-E coating including such a layer. The IR reflecting layer(s) is part of a low emissivity (low-E) coating, and may be sandwiched between at least transparent dielectric layers. In certain example embodiments, a silver (Ag) based IR reflecting layer(s) is doped with a combination of silicon (Si) and aluminum (Al), or alternatively is doped with Si and zinc (Zn), or a combination of Si, Zn and copper (Cu). In certain example embodiments, the IR reflecting layer may be of or include AgSiAl. It has surprisingly been found that a silver based IR reflecting layer doped with Si and Al provides for improved corrosion resistance and chemical durability of the layer and the overall coating, and improved stability such as reduced haze upon optional heat treatment (HT), while maintaining good optical properties, compared to an Ag IR reflecting layer that is not doped. Such low-E coating may be used in applications such as monolithic windows, insulated glass (IG) window units, and the like.

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like. In certain example instances, designers of coated articles often strive for a combination of high visible transmission, substantially neutral color, low emissivity (or emittance), low sheet resistance ($R_s$), low U-values in the context of IG window units, and/or low specific resistivity. High visible transmission and substantially neutral color may permit coated articles to be used in applications where these characteristics are desired such as in architectural or vehicle window applications, whereas low-emissivity (low-E), low sheet resistance, and low specific resistivity characteristics permit such coated articles to block significant amounts of IR radiation so as to reduce for example undesirable heating of vehicle or building interiors.

Low-E coatings having at least one silver based IR reflecting layer are known in the art. For example, see U.S. Pat. Nos. 5,344,718, 6,576,349, 8,945,714, 9,371,684, 9,028,956, 9,556,070, 8,945,714, 9,028,983, which are all hereby incorporated herein by reference. Low-E coatings on glass are widely used in commercial and residential buildings to save energy. The double Ag low-E coating is a dominant low-E product due to its excellent low emissivity properties and excellent control of solar heat gain.

However, conventional low-E coatings with silver IR reflecting layer(s) have problems associated with chemical durability and/or environmental durability which limit their applications. A reason is that the silver IR reflecting layers are not very stable, especially for double silver type low-E coatings. Once the Ag is decayed or damaged, the silver's optical, electrical, and thermal (emissivity) properties are degraded. For example, a solar control low-E coating with stack of glass/Si3N4/NiCr/Ag/NiCr/Si3N4 provides efficient solar control, but cannot reasonably survive chemical environments such as HCl acid environmental conditions. While there are some durable low-E coatings in the market, their performances are poor especially with respect to undesirably low light-to-solar gain ratio (LSG) values of around 1.0 or less. The higher the LSG value, the more energy saved. LSG is calculated as $T_{vis}$/SHGC, where SHGC is according to NRFC 2001.

Example embodiments of this invention solve these problems by providing a low-E coating that has improved silver durability (e.g., chemical durability), while maintaining high LSG values. Example embodiments of this invention relate to a coated article including an infrared (IR) reflecting layer of silver that is doped in order to improve characteristics of a low-E coating including such a layer. In certain example embodiments, a silver (Ag) based IR reflecting layer(s) is doped with a combination of silicon (Si) and aluminum (Al). In certain example embodiments, the IR reflecting layer may be of or include AgSiAl, or alternatively is Ag doped with Si and zinc (Zn), or Ag doped with a combination of Si, Zn and copper (Cu). It has surprisingly been found that a silver based IR reflecting layer doped with Si and Al, or Si and Zn, or Si, Zn and Cu, provides for improved corrosion resistance and chemical durability of the layer and the overall coating, and improved stability such as reduced haze upon optional heat treatment (HT), while maintaining good optical properties such as high LSG values of at least 1.10 (more preferably at least 1.20, and sometimes at least 1.30), compared to an Ag IR reflecting layer that is not doped. Doping SiAl into an Ag based IR reflecting layer can improve stack chemical durability while maintaining good optical properties. Such low-E coating may be used in applications such as monolithic windows, insulated glass (IG) window units, and the like.

In an example embodiment of this invention, there is provided a coated article including a coating supported by a glass substrate, the coating comprising: a first dielectric layer on the glass substrate; a first contact layer on the glass substrate over at least the first dielectric layer; an infrared (IR) reflecting layer comprising silver that is doped with Si and Al, the IR reflecting layer being on the glass substrate located over and directly contacting the first contact layer; a second contact layer on the glass substrate located over and directly contacting the IR reflecting layer; a second dielectric layer on the glass substrate located over at least the first and second contact layers and the IR reflecting layer; and wherein the coating has a sheet resistance ($R_s$) of no greater than 11 ohms/square and a normal emissivity ($E_n$) of no greater than 0.2.

In an example embodiment of this invention, there is provided a coated article including a coating supported by a glass substrate, the coating comprising: a first dielectric layer on the glass substrate; a first contact layer on the glass substrate over at least the first dielectric layer; an infrared (IR) reflecting layer comprising silver that is doped with Zn and Si, the IR reflecting layer being on the glass substrate located over and directly contacting the first contact layer; a second contact layer on the glass substrate located over and directly contacting the IR reflecting layer; a second dielectric layer on the glass substrate located over at least the first and second contact layers and the IR reflecting layer; and wherein the coating has a sheet resistance ($R_s$) of no greater than 11 ohms/square and a normal emissivity ($E_n$) of no greater than 0.2.

BRIEF DESCRIPTION OF THE DRAWINGS

FIG. 1 is a cross sectional view of a coated article according to an example embodiment of this invention.

DETAILED DESCRIPTION OF EXAMPLE EMBODIMENTS OF THE INVENTION

Referring now to the drawings in which like reference numerals indicate like parts throughout the several views.

Example embodiments of this invention relate to a coated article including an infrared (IR) reflecting layer 9 of silver that is doped in order to improve characteristics of a low-E coating including such a layer. In certain example embodiments, a silver (Ag) based IR reflecting layer(s) 9 is doped with a combination of silicon (Si) and aluminum (Al). In certain example embodiments, the IR reflecting layer 9 may be of or include AgSiAl, or AgSiZn, or AgSiZnCu. It has surprisingly been found that a silver based IR reflecting layer 9 doped with Si and Al, or Si and Zn, or Si, Zn and Cu, provides for improved corrosion resistance and chemical durability of the layer and the overall coating, and improved stability such as reduced haze upon optional heat treatment (HT), while maintaining good optical properties such as high LSG values of at least 1.10 (more preferably at least 1.20, and sometimes at least 1.30), compared to an Ag IR reflecting layer that is not doped. Doping Ag based IR reflecting layer in such a manner can improve stack chemical durability while maintaining good optical properties. Such low-E coating may be used in applications such as monolithic windows, insulated glass (IG) window units, and the like.

FIG. 1 is a cross sectional view of a coated article according to an example embodiment of this invention. The coated article includes glass substrate 1 (e.g., clear, green, bronze, or blue-green glass substrate from about 1.0 to 10.0 mm thick, more preferably from about 1.0 mm to 6.0 mm thick), and a multi-layer low-E coating (or layer system) 25 provided on the substrate 1 either directly or indirectly. As shown in FIG. 1, the low-E coating 25 is of or includes dielectric layer 2 of or including silicon nitride (e.g., $Si_3N_4$, or some other suitable stoichiometry), zinc oxide inclusive contact layer 7 (e.g., $ZnO_x$ where "x" may be about 1; or $ZnAlO_x$), IR (infrared) reflecting layer 9 including or of silver doped as discussed herein, upper contact layer 11 of or including an oxide of Ni and/or Cr (e.g., $NiCrO_x$), and an overcoat of or including tin oxide inclusive dielectric layer 13 and silicon nitride inclusive dielectric layer 15. The silicon nitride inclusive layers 2 and/or 15 may further include Al, oxygen, or the like, and the tin oxide layer 13 may likewise further include other materials such as nitrogen, zinc, or the like. Other layers and/or materials may also be provided in the coating in certain example embodiments of this invention, and it is also possible that certain layers may be removed or split in certain example instances. Moreover, one or more of the layers discussed above may be doped with other materials in certain example embodiments of this invention.

In monolithic instances, the coated article includes only one substrate such as glass substrate 1 (see FIG. 1). However, monolithic coated articles herein may be used in devices such as IG window units for example which include multiple glass substrates. Example IG window units are illustrated and described, for example, in U.S. Pat. Nos. 5,770,321, 5,800,933, 6,524,714, 6,541,084 and US 2003/0150711, the disclosures of which are all hereby incorporated herein by reference. An example IG window unit may include, for example, the coated glass substrate 1 shown in FIG. 1 coupled to another glass substrate via spacer(s), sealant(s) or the like with a gap being defined therebetween. This gap between the substrates in IG unit embodiments may in certain instances be filled with a gas such as argon (Ar). An example IG unit may comprise a pair of spaced apart substantially clear glass substrates each about 3-4 mm thick one of which is coated with a coating herein in certain example instances, where the gap between the substrates may be from about 5 to 30 mm, more preferably from about 10 to 20 mm, and most preferably about 12-16 mm. In certain example instances, the coating may be provided on the side of the inner or outer glass substrate 1 facing the gap.

Silicon nitride inclusive transparent dielectric layer 2 is provided for antireflection purposes, and have been found to allow color shifts to be reduced. Silicon nitride layer 2 may be $Si_3N_4$. Alternatively, the silicon nitride layer 2 may be of the Si-rich type (not fully stoichiometric). Moreover, one or both of the silicon nitride layers 2 and/or 15 may further include a dopant such as aluminum or stainless steel, and/or small amounts of oxygen. These layers may be deposited via sputtering in certain example embodiments, or via any other suitable technique. It is possible that other materials such as titanium oxide, zinc stannate, or tin oxide may be used for dielectric layer(s) 2 and/or 15.

Dielectric contact layer 7 is of or includes zinc oxide (e.g., ZnO). The zinc oxide of layer(s) 7 may contain other materials as well such as Al (e.g., to form $ZnAlO_x$) in certain example embodiments. For example, in certain example embodiments of this invention, zinc oxide layer 7 may be doped with from about 1 to 10% Al (or B), more preferably from about 1 to 5% Al (or B), and most preferably about 2 to 4% Al (or B). The use of zinc oxide 7 under the silver in layer 9 allows for an excellent quality of silver to be achieved. In certain example embodiments (e.g., to be discussed below) the zinc oxide inclusive layer 7 may be formed via sputtering a ceramic ZnO or metal rotatable magnetron sputtering target. It has been found that the use of the ceramic target in certain example embodiments (e.g., of ZnO, which may or may not be doped with Al, F or the like) allows for a high quality of silver to be provided thereby resulting in a lower emissivity coating. While the Zn:O in the ceramic target may be stoichiometric in certain example embodiments, at least one substoichiometric ceramic target comprising $ZnO_x$ (e.g., where $0.25 \leq x \leq 0.99$, more preferably $0.50 \leq x \leq 0.97$, and even more preferably $0.70 \leq x \leq 0.96$) may instead be used in sputter-depositing a zinc oxide inclusive layer 7 which may be substoichiometric in certain instances. It is possible that other materials such as zinc stannate, NiCr, or $NiCrO_x$ may be used for lower contact layer 7 in alternative embodiments of this invention.

Transparent infrared (IR) reflecting layer 9 is preferably conductive, and may comprise or consist essentially of silver (Ag) that is doped as discussed herein. IR reflecting layer 9 helps allow the coating to have low-E and/or good solar control characteristics such as low emittance, low sheet resistance, and so forth. The IR reflecting layer may be slightly oxidized in certain embodiments of this invention. In certain example embodiments, silver (Ag) based IR reflecting layer 9 is doped with a combination of silicon (Si) and aluminum (Al). In certain example embodiments, the IR reflecting layer 9 may be of or include AgSiAl, or AgSiZn, or AgSiZnCu. In certain example embodiments, the IR reflecting layer 9 contains from 80-99% Ag, more preferably from 90-99% Ag; from 1-20% Si, more preferably from 1-10% Si, and from 0.1 to 5% Al, more preferably from 0.3 to 4% Al. In certain example embodiments, the IR reflecting layer 9 contains from 80-99% Ag, more preferably from 90-99% Ag; from 0.4-20% Zn, more preferably from 0.4-10% Zn, and from 0.1 to 10% Si, more preferably from 0.3 to 5% Si, and optionally also from 0.1 to 10% Cu, more preferably from 0.3 to 5% Cu. Such an IR reflecting layer 9 may be sputter-deposited, via co-sputtering, using both a silver target(s) and a SiAl target(s) or ZnSi target, or ZnSiCu target, in certain example embodiments of this invention. It has surprisingly been found that a silver based IR reflecting layer 9 doped with Si and Al (or Si and Zn, or Si, Zn and Cu) provides for improved corrosion resistance and chemical durability of the layer and the overall coating, and improved stability such as reduced haze upon optional heat treatment (HT), while maintaining good optical properties such as high LSG values of at least 1.10 (more preferably at least 1.20, and sometimes at least 1.30), compared to an Ag IR reflecting layer that is not doped. Doping Ag based IR reflecting layer in such a manner can improve stack chemical durability while maintaining good optical properties.

The silver based IR reflecting layer 9 may be doped with other materials such as Cu or Zn. For example, the IR reflecting layer 9 may contain from 80-99% Ag, more preferably from 90-99% Ag, and from 1-20% Zn, more preferably from 1-10% Zn. As another example, the IR reflecting layer 9 may contain from 80-99% Ag, more preferably from 90-99% Ag, and from 1-20% Cu, more preferably from 1-10% Cu. Silver copper alloys, and silver zinc alloys, have also been found to provide for good results discussed herein with respect to improved durability and reduced haze upon optional HT such as thermal tempering.

The upper contact layer 11 may be of or include an oxide of Ni and/or Cr. In certain example embodiments, upper contact layer 11 may be of or include $NiCrMoO_x$, nickel (Ni) oxide, chromium/chrome (Cr) oxide, $TiO_x$, or a nickel alloy oxide such as nickel chrome oxide ($NiCrO_x$), or other suitable material(s). The use of, for example, $NiCrO_x$ or $NiCrMoO_x$ in this layer(s) 11 allows durability to be improved. The $NiCrO_x$ or $NiCrMoO_x$ layer 11 may be fully oxidized in certain embodiments of this invention (i.e., fully stoichiometric), or alternatively may only be partially oxidized—substoichiometric (before and/or after optional HT). In certain instances, the $NiCrO_x$ layer 11 may be at least about 50% oxidized. Contact layer 11 (e.g., of or including an oxide of Ni and/or Cr) may or may not be oxidation graded in different embodiments of this invention. Oxidation grading means that the degree of oxidation in the layer changes through the thickness of the layer so that for example a contact layer may be graded so as to be less oxidized at the contact interface with the immediately adjacent IR reflecting layer 9 than at a portion of the contact layer further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layer 11 (e.g., of or including an oxide of Ni and/or Cr) may or may not be continuous in different embodiments of this invention across the entire IR reflecting layer 9.

The overcoat is of or includes transparent dielectric layers 13 and 15 in certain example embodiments. Dielectric layer 13 may be of or include a metal oxide such as tin oxide in certain example embodiments of this invention. Metal oxide inclusive layer 13, such as tin oxide or zinc stannate, is provided for antireflection purposes, and also improves the emissivity of the coated article and the stability and efficiency of the manufacturing process. The tin oxide inclusive layer 13 may be doped with other materials such as nitrogen and/or zinc in certain example embodiments of this invention. The tin oxide based layer 13 provides good durability and improves light transmission. Dielectric layer 15 may be of or include silicon nitride (e.g., $Si_3N_4$ or other suitable stoichiometry) or any other suitable material in certain example embodiments of this invention such as silicon oxynitride. Silicon nitride layer 15 may further include other material, such as aluminum as a dopant or small amounts of oxygen in certain example embodiments of this invention. Optionally, other layers such as a zirconium oxide overcoat may be provided above layer 15 in the overcoat in certain example instances. Layer 15 is provided for durability purposes, and to protect the underlying layers. In certain example embodiments, silicon nitride based layer 15 may have an index of refraction (n) of from about 1.9 to 2.2, more preferably from about 1.95 to 2.05. In certain example embodiments, Zr may be provided in the silicon nitride of layer 15 (or layer 2 or layer 5). Thus, one or more of layers 2 and/or 15 may be of or include $SiZrNx$ and/or zirconium oxide in certain example embodiments of this invention.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses may be used in different embodiments of this invention, example thicknesses and materials for the respective layers on the glass substrate 1 in the FIG. 1 embodiment are as follows, from the glass substrate outwardly (e.g., the Al content in the zinc oxide layer and the silicon nitride layers may be from about 1-10%, more preferably from about 1-3% in certain example instances):

TABLE 1

(Example Materials/Thicknesses; FIG. 1 Embodiment)

| Layer | Preferred Range (Å) | More Preferred (Å) | Example (Å) |
|---|---|---|---|
| $Si_xN_y$ (layer 2) | 20-300 Å | 60-160 Å | 135 Å |
| $ZnAlO_x$ (layer 7) | 10-200 Å | 40-120 Å | 90 Å |
| Ag doped (layer 9) | 40-120 Å | 65-95 Å | 85 Å |
| $NiCrO_x$ (layer 11) | 10-70 Å | 20-50 Å | 30 Å |
| $SnO_2$ (layer 13) | 80-210 Å | 160-180 Å | 170 Å |
| $Si_xN_y$ (layer 15) | 100-250 Å | 160-180 Å | 170 Å |

In certain example embodiments of this invention, coated articles herein (e.g., see FIG. 1) may have the following low-E (low emissivity), solar and/or optical characteristics set forth in Table 2 when measured monolithically, before and/or after any optional heat treatment such as thermal tempering.

TABLE 2

Low-E/Solar Characteristics (Monolithic)

| Characteristic | General | More Preferred | Most Preferred |
|---|---|---|---|
| $R_s$ (ohms/sq.): | <=11.0 | <=10 | <=9 |
| $E_n$: | <=0.2 | <=0.15 | <=0.11 |
| $T_{vis}$ (%): | >=40 | >=50 | >=60 |

While the doped silver IR reflecting layer 9 is used in the coating of FIG. 1 in certain example embodiments of this invention discussed above, it is possible to use one or more of the doped IR reflecting layer(s) 9 of any embodiment described herein in other low-E coatings. For example and without limitation, the silver based IR reflecting layers in the low-E coatings in any of U.S. Pat. Nos. 5,344,718, 6,576,349, 8,945,714, 9,371,684, 9,028,956, 9,556,070, 8,945,714, and/or 9,028,983 (which are all hereby incorporated herein by reference) may be replaced with the doped silver IR reflecting layer(s) 9 discussed herein in connection with any and all embodiments of this invention. In other words, for example, the silver based IR reflecting layer(s) in any of U.S. Pat. Nos. 5,344,718, 6,576,349, 8,945,714, 9,371,684, 9,028,956, 9,556,070, 8,945,714, and/or 9,028,983 may be replaced with a silver IR reflecting layer 9 that is doped with SiAl, SiZn, SiZnCu, Cu, Zn, or any other dopant discussed herein.

An Example coated article according to an embodiment of this invention, and a comparative example (CE), were made and tested, each having the same low-E coating, except that in the CE the IR reflecting layer 9 was pure silver and in the Example according to an example of this invention the IR reflecting layer was silver doped with about 6% Si and about 0.6% Al. The contact layers 7 and 11 were both of NiCr. The comparative example (CE) had a low-E coating of glass/ $Si_3N_4$/NiCr/Ag/NiCr/$Si_3N_4$, where the IR reflecting layer was pure Ag. Meanwhile, the Example according to an embodiment of this invention had the same layer stack as the CE, except that the IR reflecting layer 9 was Ag doped with Si and Al. The data from the CE (pure Ag IR reflecting layer 9) and the Example (AgSiAl IR reflecting layer 9) is set forth below, both before and after HT at about 650 degrees C. for about 12 minutes. Note that in the chart below sheet resistance ($R_S$) is in units of ohms/square, and that "normal" stands for normal emmisivity/emittance ($E_n$).

|  |  |  | Ag stack | | AgSiAl stack | |
|---|---|---|---|---|---|---|
|  |  |  | AC | HT | AC | HT |
| Mono- | T | Y (%) | 54.96 | 55.28 | 50.2 | 50 |
| lithic |  | a* | -2.85 | -3.17 | -2.87 | -3.01 |
| Optics |  | b* | 1.17 | -1.09 | 1.69 | -0.59 |
| (III 'C', | Rg | Y (%) | 23.78 | 24.2 | 24.8 | 25.1 |
| 2 deg |  | a* | -1.29 | -0.28 | -2.58 | -1.46 |
|  |  | b* | -5.47 | -5.13 | -3.29 | -4.35 |
|  | Rf | Y (%) | 8.15 | 9.09 | 5.6 | 6.1 |
|  |  | a* | 9.32 | 9.79 | 12.3 | 12.5 |
|  |  | b* | -22.09 | -19.75 | -26.6 | -23.6 |
|  |  | A[vis] (100-TT-Rf) | 36.89 | 35.63 | 44.2 | 43.9 |
|  |  | A[vis] (100-TT-Rg) | 21.26 | 20.52 | 25 | 24.9 |
| Rs |  |  | 4.80 | 4.34 | 7.38 | 6.70 |
| Normal |  |  | 0.050 | 0.043 | 0.070 | 0.081 |
| Haze (%) |  |  | 0.19 | 0.29 | 0.15 | 0.19 |
| HT - AC | Rf ΔE* |  | 3.03 | | 3.32 | |
|  | Rg ΔE* |  | 1.15 | | 1.57 | |
|  | T ΔE* |  | 2.29 | | 2.29 | |
|  | T \|Δb*\| |  | 2.26 | | 2.28 | |
|  | T ΔY% |  | 0.32 | | 0.20 | |
| NFRC | Tvis (%) |  | 55.0 | 55.3 | 50.2 | 50.0 |
| 2001 | Tsol (%) |  | 35.6 | 35.2 | 34.0 | 32.7 |
| mono- | Rsol (%) |  | 34.8 | 35.2 | 32.2 | 32.3 |
| lithic 2 | Asol (%) |  | 29.7 | 29.7 | 33.8 | 35.0 |
|  | Uval |  | 0.589 | 0.583 | 0.605 | — |
|  | SHGC |  | 39.8 | 39.3 | 39.0 | — |
|  | LSG |  | 1.4 | 1.4 | 1.3 | — |

Both the CE and Example has similar transmission and color properties shown above prior to HT.

However, in chemical tests it was surprisingly found that doping the silver IR reflecting layer with Si and Al improved chemical durability. The same chemical durability HCl soak testing applied to both the CE and the Example showed that the CE coating with the pure Ag IR reflecting layer had a significant number of visible defects (white spots in images) and reflected haze under a flashlight, whereas the Example coating having the silver IR reflecting layer doped with Si and Al had much fewer defects and significantly reduced haze. These surprising and unexpected results, due to the doping of the Ag with Si and Al, provided for a superior coating having improved chemical durability both before and after any optional HT. Coatings according to example embodiments of this invention preferably have a haze value of no greater than 0.17 (more preferably no greater than 0.16) prior to any optional HT, and of no greater than 0.22 (more preferably no greater than 0.20) after any optional HT such as thermal tempering.

In an example embodiment of this invention, there is provided a coated article including a coating supported by a glass substrate, the coating comprising: a first dielectric layer on the glass substrate; a first contact layer on the glass substrate over at least the first dielectric layer; an infrared (IR) reflecting layer comprising silver that is doped with Si and Al, the IR reflecting layer being on the glass substrate located over and directly contacting the first contact layer; a second contact layer on the glass substrate located over and directly contacting the IR reflecting layer; a second dielectric layer on the glass substrate located over at least the first and second contact layers and the IR reflecting layer; and wherein the coating has a sheet resistance ($R_s$) of no greater than 11 ohms/square and a normal emissivity ($E_n$) of no greater than 0.2.

In the coated article of the immediately preceding paragraph, the IR reflecting layer may comprise from 80-99% Ag, from 1-20% Si, and from 0.1 to 5% Al.

In the coated article of any of the preceding two paragraphs, the IR reflecting layer may comprise from 90-99% Ag, from 1-10% Si, and from 0.3 to 4% Al.

In the coated article of any of the preceding three paragraphs, the coated article may have a visible transmission of at least 40%, more preferably of at least 50%.

In the coated article of any of the preceding four paragraphs, the coated article may have a light-to-solar gain ratio (LSG) of at least 1.10, more preferably of at least 1.20, and possibly of at least 1.30.

In the coated article of any of the preceding five paragraphs, the first dielectric layer may comprise silicon nitride.

In the coated article of any of the preceding six paragraphs, the first contact layer may comprise Ni and/or Cr, or zinc oxide.

In the coated article of any of the preceding seven paragraphs, the second contact layer may comprise Ni and/or Cr, such as NiCr, $NiCrO_x$, or $NiCrMoO_x$.

In the coated article of any of the preceding eight paragraphs, the second dielectric layer may comprise silicon nitride.

In the coated article of any of the preceding nine paragraphs, the coating may have a sheet resistance ($R_S$) of no greater than 9 ohms/square and/or a normal emissivity ($E_n$) of no greater than 0.11.

In the coated article of any of the preceding ten paragraphs, the coating may further comprise another infrared (IR) reflecting layer comprising silver that is doped with Si and Al.

In an example embodiment of this invention, there is provided a coated article including a coating supported by a glass substrate, the coating comprising: a first dielectric layer on the glass substrate; a first contact layer on the glass substrate over at least the first dielectric layer; an infrared (IR) reflecting layer comprising silver that is doped with Zn and Si, the IR reflecting layer being on the glass substrate located over and directly contacting the first contact layer; a second contact layer on the glass substrate located over and directly contacting the IR reflecting layer; a second dielectric layer on the glass substrate located over at least the first and second contact layers and the IR reflecting layer; and wherein the coating has a sheet resistance ($R_s$) of no greater than 11 ohms/square and a normal emissivity ($E_n$) of no greater than 0.2.

In the coated article of the immediately preceding paragraph, the IR reflecting layer may comprise from 80-99% Ag, from 0.4-20% Zn, and from 0.1 to 10% Si.

In the coated article of any of the preceding two paragraphs, the IR reflecting layer may comprise from 90-99% Ag, from 0.4-10% Zn, and from 0.3 to 5% Si.

In the coated article of any of the preceding three paragraphs, the IR reflecting layer may further comprises from 0.1 to 10% Cu, more preferably from 0.3 to 5% Cu. These percentages are all atomic %.

In the coated article of any of the preceding four paragraphs, the coated article may have a visible transmission of at least 40%, more preferably of at least 50%.

In the coated article of any of the preceding five paragraphs, the coated article may have a light-to-solar gain ratio (LSG) of at least 1.10, more preferably of at least 1.20, and most preferably of at least 1.30.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising:
   a first dielectric layer on the glass substrate;
   a first contact layer on the glass substrate over at least the first dielectric layer;
   an infrared (IR) reflecting layer comprising Ag, Zn, Si, and Cu, the IR reflecting layer being on the glass substrate located over and directly contacting the first contact layer, and wherein the IR reflecting layer comprises from 80-99% Ag, from 0.4-20% Zn, from 0.1-10% Si, and from 0.3-5% Cu (atomic %), wherein the IR reflecting layer contains more Ag than each of Zn, Si, and Cu, and wherein the IR reflecting layer contains more Zn than Cu;
   a second contact layer on the glass substrate located over and directly contacting the IR reflecting layer;
   a second dielectric layer on the glass substrate located over at least the first and second contact layers and the IR reflecting layer;
   wherein the coating has a sheet resistance ($R_s$) of no greater than 11 ohms/square and a normal emissivity ($E_n$) of no greater than 0.2; and
   wherein the coated article has a light-to-solar gain ratio (LSG) of at least 1.10.

2. The coated article of claim 1, wherein the coated article has a light-to-solar gain ratio (LSG) of at least 1.20.

3. The coated article of claim 1, wherein the coated article has a visible transmission of at least 40%.

4. The coated article of claim 1, wherein the coated article has a visible transmission of at least 50%.

5. The coated article of claim 1, wherein the coated article has a light-to-solar gain ratio (LSG) of at least 1.20.

6. The coated article of claim 1, wherein the coating has a sheet resistance ($R_S$) of no greater than 9 ohms/square and a normal emissivity ($E_n$) of no greater than 0.11.

7. The coated article of claim 1, wherein the second dielectric layer comprises silicon nitride.

8. The coated article of claim 1, wherein the first dielectric layer comprises silicon nitride.

9. The coated article of claim 1, wherein the first contact layer comprises zinc oxide.

10. The coated article of claim 1, wherein the second contact layer comprises Ni and/or Cr.

11. The coated article of claim 1, wherein the coating further comprises another infrared (IR) reflecting layer comprising silver that is doped with Cu, Si and Zn.

12. The coated article of claim 1, wherein the second contact layer comprises an oxide and comprises Ni, Cr, and Mo.

* * * * *